United States Patent
Shinde et al.

(10) Patent No.: US 8,306,128 B2
(45) Date of Patent: Nov. 6, 2012

(54) CLOCKED OUTPUT OF MULTIPLE DATA STREAMS FROM A COMMON DATA PORT

(75) Inventors: Hrishikesh Anil Shinde, Dallas, TX (US); Steven Derrick Clynes, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2866 days.

(21) Appl. No.: 10/860,936

(22) Filed: Jun. 4, 2004

(65) Prior Publication Data

US 2005/0259746 A1 Nov. 24, 2005

Related U.S. Application Data

(60) Provisional application No. 60/573,320, filed on May 21, 2004.

(51) Int. Cl.
*H04N 7/12* (2006.01)
(52) U.S. Cl. ................................. 375/240.28
(58) Field of Classification Search ............ 375/240.25, 375/240.28
See application file for complete search history.

(56) References Cited

U.S. PATENT DOCUMENTS

| 6,903,706 | B1 * | 6/2005 | Trottier et al. | 345/1.1 |
| 6,989,827 | B2 * | 1/2006 | Myers | 345/204 |
| 7,102,692 | B1 * | 9/2006 | Carlsgaard et al. | 348/572 |

OTHER PUBLICATIONS

"TW2802/4 Multiple Video Decoder for Security Application", preliminary data sheet (Techwell, Inc., Sep. 9, 2003).

* cited by examiner

*Primary Examiner* — Jay Patel
*Assistant Examiner* — Richard Torrente
(74) *Attorney, Agent, or Firm* — John J. Patti; Wade J. Brady, III; Frederick J. Telecky, Jr.

(57) ABSTRACT

A video display system, such as useful in video surveillance applications, is disclosed. The system includes a video decoder (20) having a common output data port (27) at which it presents interleaved data streams (DSA, DSB). The interleaved data streams (DSA, DSB) may correspond to multiple scalings of a processed video input signal, for example as received from a surveillance camera (C1, C2, C3, C4). The video decoder (20) also outputs multiple clock signals (CLKA, CLKB), each of which are synchronous with a corresponding one of the interleaved data streams (DSA, DSB). This enables a common data port (27) to output multiple data streams (DSA, DSB), while individual destinations (30A, 30B) of the data streams (DSA, DSB) can continue to operate at legacy clock rates.

10 Claims, 5 Drawing Sheets

CLOCKED OUTPUT OF MULTIPLE DATA STREAMS FROM A COMMON DATA PORT

CROSS-REFERENCE TO RELATED APPLICATIONS

This application claims priority, under 35 U.S.C. §119(e), of Provisional Application No. 60/573,320, filed May 21, 2004.

STATEMENT REGARDING FEDERALLY SPONSORED RESEARCH OR DEVELOPMENT

Not applicable.

BACKGROUND OF THE INVENTION

This invention is in the field of digital systems, and is more specifically directed to the communication of digital data streams among integrated circuits in such systems.

In many digital systems, digital data must be communicated among various integrated circuits. While data communication may be asynchronous, synchronous communication is preferred for high data rates. A common approach to synchronous data communication involves the use of a clock signal, generated either by the data source or the data destination, that the data stream is synchronized with. The source and destination integrated circuits synchronize their output and input operations with the communicated clock signal, ensuring high reliability communication.

FIG. 1a illustrates a conventional instance of data communication between a data source and a data destination (or data "sink"). In this example, the source is video decoder 2, which forwards an eight-bit data stream, in this example, over bus D to video encoder 4 (e.g., an MPEG encoder). In this example, video decoder 2 generates clock signal CLK1 synchronously with the data stream on bus D. In some applications, the data destination generates the clock signal; a well-known example of this approach is conventional memory access, in which the data destination applies clock signals to the memory to effect the read and write operations. Referring back to FIG. 1a, video encoder 4 receives both the eight-bit data stream on bus D and clock signal CLK1, and synchronizes its buffering and latching of the data values in the data stream with edges of clock signal CLK1.

FIG. 1b illustrates the relative tiling of data on bus D with clock signal CLK1 in this example. As shown in FIG. 1b, data bus D presents sequential data words $DATA_k$ et seq. Clock signal CLK1 is synchronized with this stream of data words, in this example with a rising edge of clock signal CLK1 occurring when a valid data word $DATA_k$ is present on data bus D. In the example shown in FIG. 1b, video decoder 2 presents valid data on data bus D at a setup time $t_{SU}$ prior to the rising edge of clock signal CLK1, and maintains valid data on data bus D for a hold time $t_H$ after the rising edge of clock signal CLK1; these setup and hold times $t_{SU}$ and $t_H$, respectively, must exceed the input data setup and data hold time specifications for video encoder 4 in order for reliable communication to occur.

As fundamental in the art, system performance is determined in large part by the rate at which data can be input to, output from, and communicated within, the system. Maximization of this performance is, in general, achieved by increasing the data communication rate to match the full processing capacity of the various components in the system.

By way of further background, so-called "dual-data-rate" ("DDR") memories are known in the art. DDR memories, such as DDR synchronous dynamic random access memories (SDRAMS), respond to both the rising and falling edges of the clock signal, such that the data stream is at twice the frequency of the clock signal. FIG. 1c illustrates such a DDR data stream, in which data words $DATA_k$ et seq. are provided from the data source in a synchronous manner with both edges of clock signal CLK1. This dual data rate approach doubles the data rate of the communicated data stream without increasing the number of bus lines or integrated circuit input and output terminals, as compared to the conventional components of FIG. 1a. However, both the source and destination of the data stream must operate according to the dual data rate approach in order for valid communications to occur. In addition, the constraints on the data input and output circuitry (i.e., the setup and hold times achievable at the data source, and acceptable at the data destination) tighten in this DDR mode, relative to the single edge clocking of FIG. 1b. Skew in the timing of the various output bit drivers relative to one another must also be tightly controlled in this DDR operation.

By way of further background, the communication of multiple data streams from a single source component is known, particularly in the field of video decoding. Multiple data streams are especially useful in applications such as video surveillance for security purposes. As is well known in this field, it is useful for a human security officer to simultaneously view images from multiple surveillance cameras, typically by way of a single video display that shows several camera views in a "split-screen" manner. The simultaneous display of four to sixteen video camera images is well known. This split-screen display need not be of maximum resolution, and as such the images are typically "scaled" to a smaller image area (in terms of pixels) for split-screen display. However, modern video security systems also record the images from all of the cameras, preferably in full resolution to permit investigative use of recorded images. Accordingly, modern video security systems utilize both scaled image data (lower resolution) and unscaled image data (full resolution).

In one conventional approach, unscaled video data is provided by a video decoder to a digital signal processor (DSP). The DSP then processes this unscaled video data to generate an unscaled output for recording, and also scaled video signals for split-screen display. But the computational capacity of conventional DSP devices may not be sufficient to perform this processing for real-time display and recording, especially if multiple video cameras and inputs are to be recorded and displayed. It is therefore preferable for the video decoder to produce multiple video data streams, at multiple scalings, to a downstream component such as an encoder.

According to one conventional approach, two data streams may be separately output from the source, each with its own clock signal, for separate receipt and processing at the destination. This approach is illustrated in FIG. 1d, in which video decoder 2' drives one data stream over bus D1, in combination with clock signal CLK1, and a second data stream over bus D2 in combination with clock signal CLK2. video encoder 4' receives both data streams over buses D1, D2, and both clock signals CLK1, CLK2, and includes multiple encoding circuitry for processing each data stream.

However, this conventional approach requires each of video decoder 2' and video encoder 4' to include additional input and output terminals, or "pins", to accommodate the additional data bus D2 and the additional clock signal CLK2. Considering that many modern integrated circuits already have hundreds of pins, the adding of still additional pins is discouraged. Not only must additional pins be provided in this conventional approach, but the circuit board onto which the source and destination components are implemented must also provide additional conductors (and the required spacing between conductors), which undesirably increases the circuit board area and the effects of parasitic inductance and capacitance.

According to another conventional approach, as described in a preliminary data sheet for the TW2802/4 Multiple Video Decoder, published by Techwell, Inc., two data streams (e.g., a video data stream that is communicated in two different video scalings) are interleaved into a double data rate stream. FIG. 1e illustrates this conventional approach. As shown in FIG. 1e, double data rate clock signal CLK2X is provided, in this case by video decoder 2 of FIG. 1a, in combination with interleaved data streams DS1, DS2. Double data rate clock signal CLK2X may be generated by doubling the frequency of a conventional video clock signal (e.g., CLK1 of FIGS. 1b and 1c), or otherwise. Data stream DS1 is presented in alternate cycles of double data rate clock signal CLK2X, with data stream DS2. In this example, the rising edge of double data rate clock signal CLK2X permits destination video encoder 4 to clock in a valid data state then present on data bus D.

The conventional approach illustrated in FIG. 1e results in the communication of two data streams, each at the same effective video rate as in the conventional arrangement of FIG. 1b. For example, the video communication format according to the well-known industry standard ITU-R BT.656 communicates video data at 27 MHz. The interleaved approach of FIG. 1e communicates the two data streams DS1, DS2, each at 27 MHz, by generating the double data rate (54 MHz) interleaved data stream on bus D, in combination with double data rate clock signal CLK2X (also at 54MHz). The destination (e.g., video encoder 4 of FIG. 1a) can then separate the two data streams from one another. As mentioned above, this approach is known to be beneficial for communicating video signals corresponding to two different image scalings, as is useful in security video applications in which a video sequence is communicated at full resolution for recording, and is also communicated at a reduced resolution version for display. This communication of two data streams is accomplished without requiring the additional pins and circuit board conductors that are necessary in the conventional approach of FIG. 1d.

However, this approach of FIG. 1e requires not only the source (e.g., video decoder 2 of FIG. 1a) to be capable of transmitting the interleaved data streams at 54 MHz and the double data rate clock signal CLK2X, but also requires the destination (e.g., video encoder 4 of FIG. 1a) to receive and separate the two interleaved data streams from one another at the higher data rate, synchronously with double data rate clock signal CLK2X. The interleaved approach of FIG. 1e is therefore not compatible with "legacy" video components, such as those MPEG encoders and other integrated circuits that operate according to the ITU-R BT.656 standard. The widespread applicability of this approach is therefore quite limited.

BRIEF SUMMARY OF THE INVENTION

It is therefore an object of this invention to provide a data communications system and method in which multiple data streams can be communicated to destination devices at a high data rate.

It is a further object of this invention to provide such a system and method in which the destination devices can receive a data stream at a reduced clock rate, consistent with conventional data timing.

It is a further object of this invention to provide such a system and method in which the multiple data streams can remain coherent with one another.

It is a further object of this invention to provide such a system and method that is well-suited for video data communications, especially video security applications.

Other objects and advantages of this invention will be apparent to those of ordinary skill in the art having reference to the following specification together with its drawings.

The present invention may be implemented into a system including a data source and one or more data destinations, each of which are preferably integrated circuit devices. The data source has a common output port that presents multiple data streams in an interleaved, or multiplexed, fashion. The data source also includes clock circuitry that present multiple clock signals, each at the same frequency but phase-shifted from one another. Each of the multiple clock signals is aligned in phase with a corresponding one of the interleaved data streams. Data words are output from the data port at a frequency corresponding to a multiple of the clock frequency, the multiple corresponding to the number of interleaved data streams and clock signals. Each data destination can receive any one of the interleaved data streams, at a conventional clock rate, by synchronizing to one of the multiple clock signals.

DETAILED DESCRIPTION OF THE INVENTION

The present invention will be described in connection with its preferred embodiment, namely as implemented into a video security system, as it is contemplated that such a system will especially benefit from this invention. However, it is also contemplated that this invention can be implemented in other video systems, and indeed in other systems in which multiple streams of data are to be communicated from a data source to one or more data destinations. Accordingly, it is to be understood that the following description is provided by way of example only, and is not intended to limit the true scope of this invention as claimed.

Figure 1A:
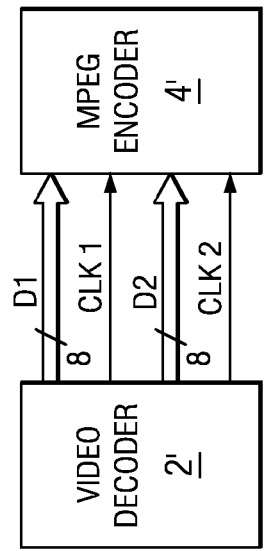
FIGS. 1a and 1d are electrical diagrams, in block form, of conventional video systems including a data source and a data destination.
Figure 1D:
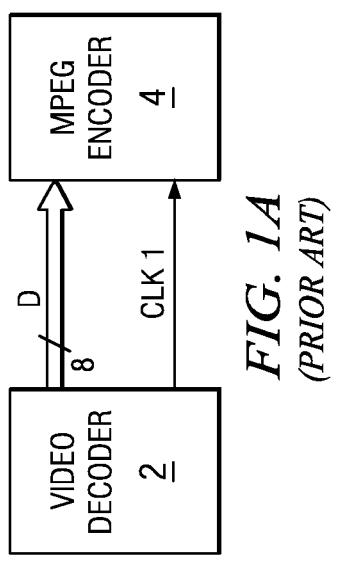
Figure 1B:
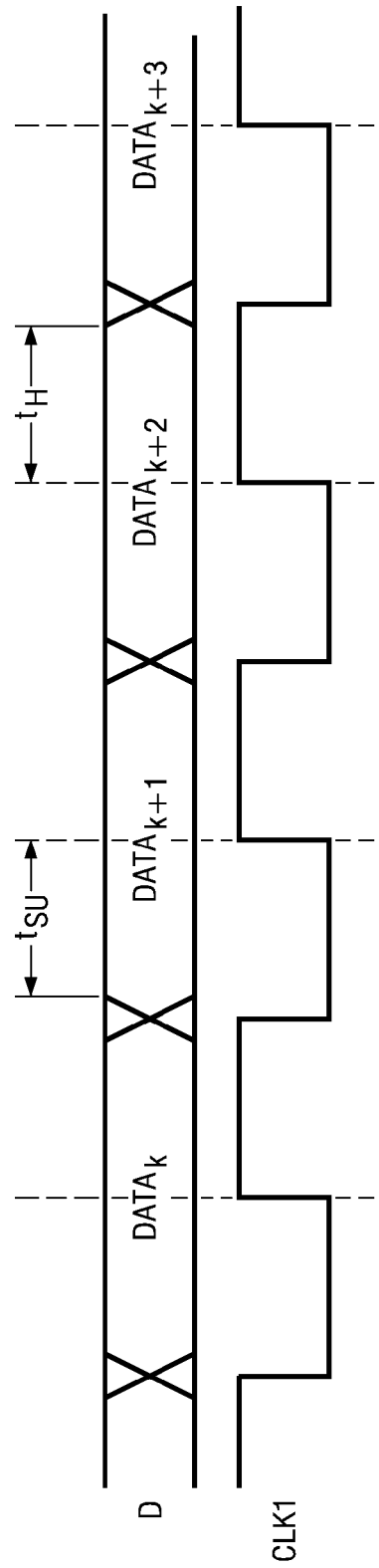
FIGS. 1b, 1c, and 1e are timing diagrams illustrating the operation of the conventional video systems of FIGS. 1a and 1d.
Figure 1C:
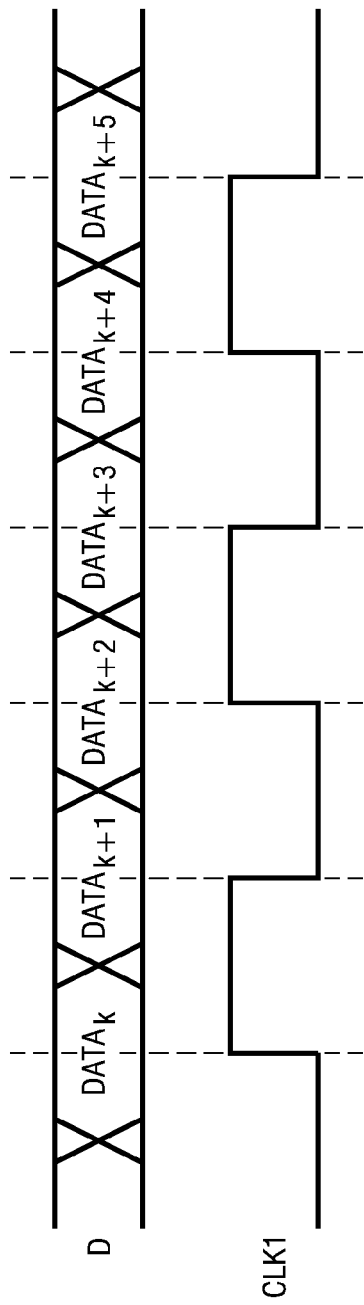
Figure 1E:
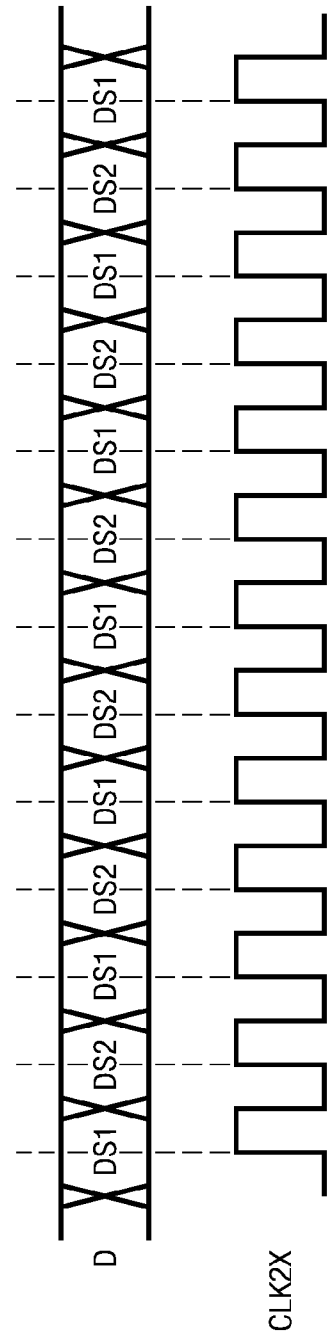
Figure 2:
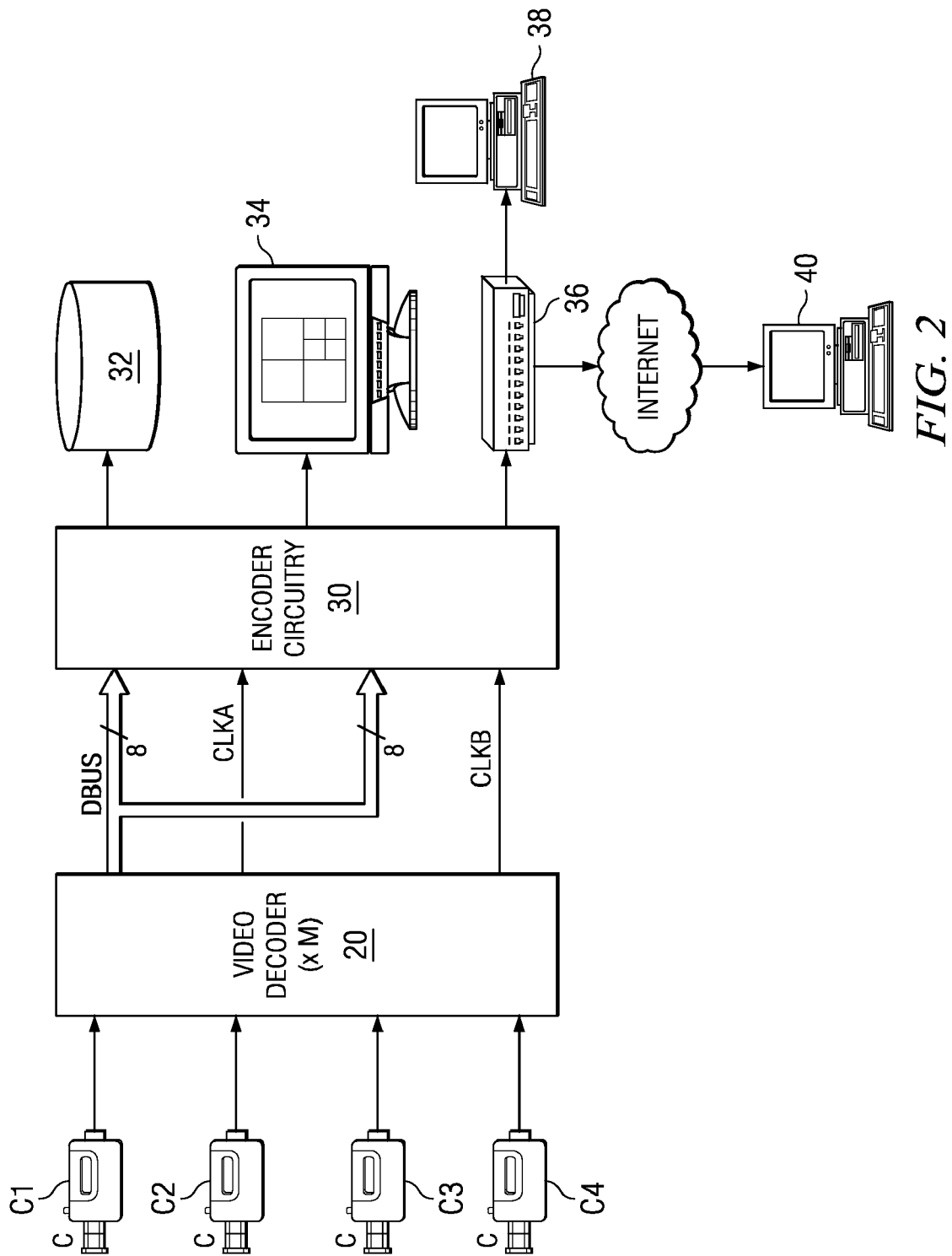
FIG. 2 is an electrical diagram, in block form, of a video security system constructed according to the preferred embodiment of the invention.

FIG. 2 illustrates an exemplary security system constructed according to the preferred embodiment of the invention. In this exemplary security system, four surveillance cameras C1 through C4 are deployed throughout the premises to be monitored. Each of cameras C1 through C4 are connected to video decoder 20, and provide analog video signals corresponding to images from their respective field of view.

Video decoder 20, in this embodiment of the invention, includes one or more decoder functions, for processing video signals received from its inputs. In a preferred embodiment of the invention, video decoder 20 may include multiple decoder functions, corresponding roughly (or exactly) to the number of inputs that it is capable of receiving. Each decoder function included in video decoder 20 is contemplated to have a high level of functionality, as suitable for the particular video processing to be performed. For example, video decoder 20 may include four decoder functions, each corresponding to a TVP5150 video decoder available from Texas Instruments Incorporated. A more detailed example of the construction of video decoder 20 will be provided in further detail below.

As shown in FIG. 2, a common output data port of video decoder 20 drives digital data on bus DBUS. Bus DBUS, for example eight bits wide, is connected to two or more inputs of the data destination, which in this example is encoder circuitry 30. In addition, video decoder 20 drives multiple (in this example, two) clock signals CLKA, CLKB, which are applied to encoder circuitry 30.

In general, video decoder 20 according to this preferred embodiment of the invention presents video data at its common output port, onto data bus DBUS, arranged as multiple interleaved data streams. Video decoder 20 also generates an output synchronizing clock signal for each of the interleaved data streams. As a result, a destination connected to data bus DBUS and receiving one of the multiple clock signals will be able to receive and process one of the interleaved data streams, at a slower clock rate than the rate at which the data streams are multiplexed onto data bus DBUS. This enables the destination to operate at "legacy" data rates, for example the 27 MHz data rate of the ITU-R BT.656 video standard, while the source of the video data is presenting more than one video feeds, for example of the same video image but at different scalings and each corresponding to an existing video standard such as the ITU-R BT.656 standard, to multiple encoder functions. This operation of video decoder 20 according to the preferred embodiment of the invention will be described in further detail below.

Referring back to FIG. 2, encoder circuitry 30 receives the interleaved data streams on bus DBUS, and clock signals CLKA, CLKB directly from video decoder 20. Encoder circuitry 30, which in this example may be realized by way of a TMS320DM462 Video/Imaging Fixed-Point Digital Signal Processor available from Texas Instruments Incorporated, operates according to program routines for the desired video signal processing, for example encoding according to the well-known Motion Picture Experts Group (MPEG) standard. In the system of FIG. 2, encoder circuitry 30 provides video output signals to display 34 (capable of split-screen display of selected camera input), disk storage 32 for storage of full resolution video image data, and to router 36. Router 36 permits access and display of the camera images by computer workstation 38 by way of a local area network (LAN), and access and display of the camera images by remote computer workstation 40 over the Internet or another wide area network (WAN).

In the system of FIG. 2, it is useful to communicate video image data at different scalings corresponding to different image sizes and resolutions. In addition, given the multiple video sources (cameras C1 through C4) and the multiple ultimate destinations (disk storage 32, display 34, and workstations 38, 40), it is desirable that video decoder 20 provide multiple video data streams corresponding to the multiple scalings, rather than provide only unscaled video image so that a DSP implementing encoder circuitry 30 becomes burdened with the task of scaling the video data. The preferred embodiment of the invention is directed to providing this function.

Figure 3:
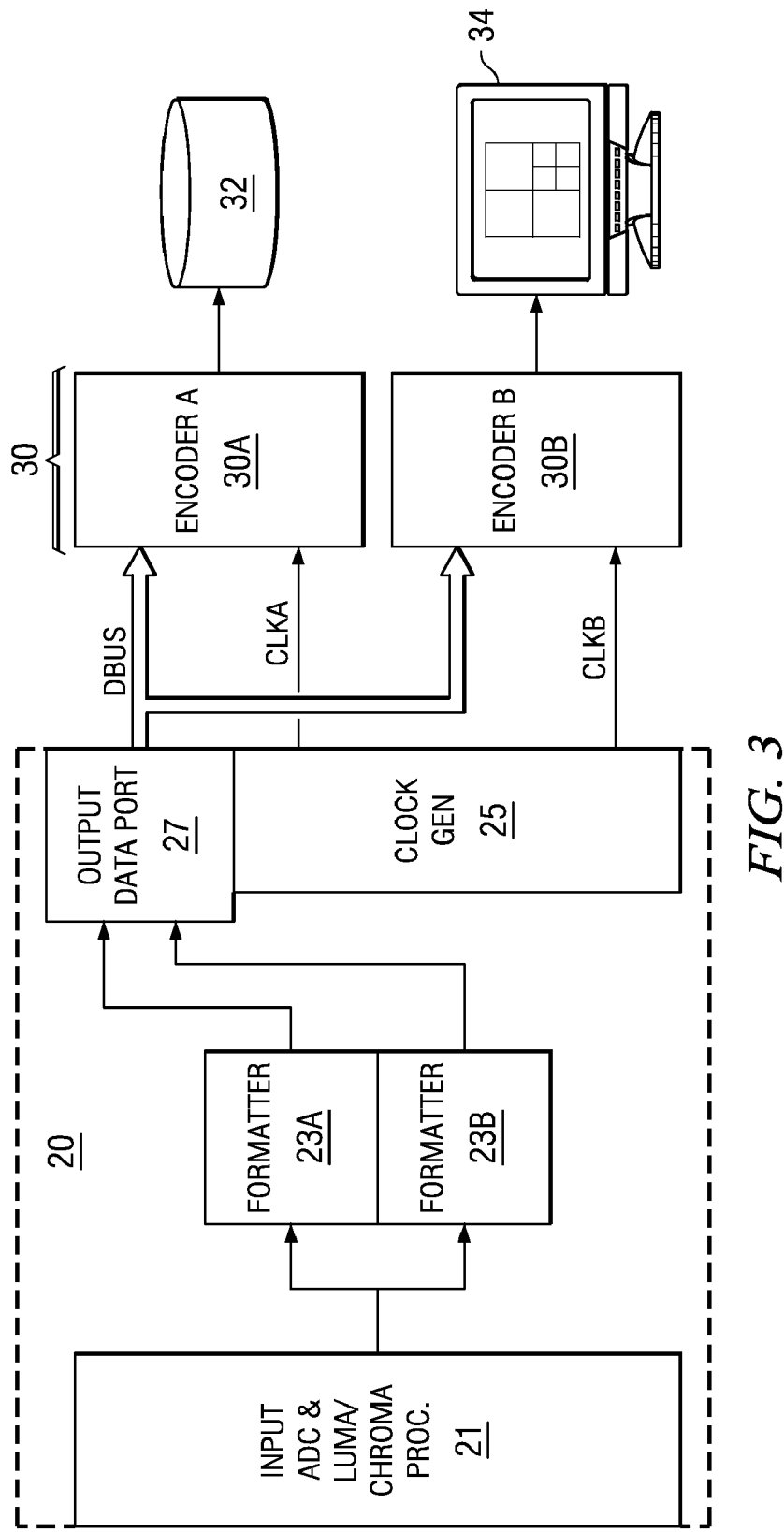
FIG. 3 is an electrical diagram, in block form, of a data source and data destination in the system of FIG. 2, constructed according to the preferred embodiment of the invention.

Referring now to FIG. 3, a more detailed description of the construction of video decoder 20 according to the preferred embodiment of the invention will now be described. As mentioned above, video decoder 20 provides conventional video decoding functions, such as those performed by the TVP5150 video decoder. In this example, function 21 interfaces with the ultimate data sources (e.g., cameras C1 through C4 of FIG. 1), performs analog-to-digital conversion, filters the video signals in the analog and digital domain, applies automatic gain control (AGC), and executes luma and chroma separation and processing, all as well known in the art.

As evident from FIG. 2, the video signals received by video decoder 20 are to be forwarded as video data streams to encoder circuitry 30, preferably including multiple scalings of the same image stream as mentioned above. Accordingly, video decoder 20 includes multiple formatters 23, for applying the desired scaling to a video signal after its processing by function 21. In the example shown in FIG. 3, two such formatters 23A, 23B are shown, each of which scale the frames of a video sequence according to a programmed value. Of course, more than two formatters 23 may be provided in video decoder 20, depending on its capacity. The scalings applied by formatters 23 may, of course, include a 1:1 scaling to provide unscaled video output for recording purposes. An output from each of formatters 23A, 23B is applied to common output data port 27, which drives data bus DBUS in an interleaved manner as will be described in further detail below relative to FIG. 4. Typically, each eight-bit data word output from output data port 27 in a given data stream corresponds to a value for a pixel in the scaled image (for example, an intensity value of a color component of the pixel). Of course, the digital data being output from common output data port 27 may alternatively be ancillary data, for example as defined in the ITU-R BT.656 data specification, or may be encoded or arranged in some other format other than a one-to-one pixel to data word correspondence.

Figure 4:
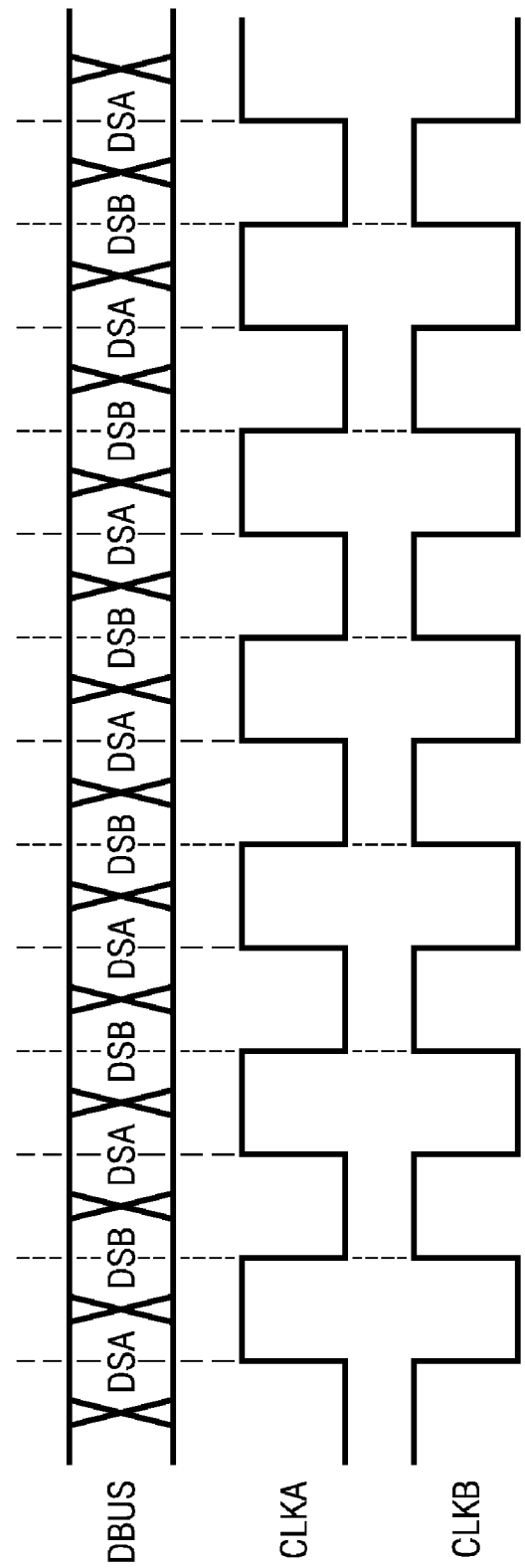
FIG. 4 is a timing diagram illustrating the communication of video data in the system of FIGS. 2 and 3, according to the preferred embodiment of the invention.

Also included within video decoder 20 is clock generator 25. Clock generator 25 generates clock signals CLKA, CLKB at substantially the same frequency, but at a phase shift relative to one another. It is contemplated that clock generator 25 may be realized by conventional clock circuitry, such as analog or digital phase-locked loops, frequency synthesizers, and the like. Clock signals CLKA, CLKB are output from separate clock terminals of video decoder 20, for independent communication over separate conductors to encoder circuitry 30. Referring now to FIG. 4, the relationship of clock signals CLKA, CLKB to the interleaved video data streams presented on data bus DBUS from output data port 27 will now be described.

In the example of FIG. 4, two data streams DSA, DSB are driven by common output data port 27 onto data bus DBUS. Data streams DSA, DSB are coherent, and preferably have the same period (i.e., are applied to databus DBUS at the same frequency, for example 27 MHz for ITU-R BT.656 video standard data). But the duty cycle of each of data streams DSA, DSB are approximately one-half that of a full standard data output, and data streams DSA, DSB are interleaved relative to one another, so that valid data words of data stream DSA immediately follow and immediately precede each valid data word of data stream DSB. In addition, for the example of ITU-R BT.656 video standard data, each of data streams DSA, DSB will include the appropriate data words for "start of active video" ("SAV"), and "end of active video" ("EAV"), as known in the art for framing and synchronization of the digital data streams. Especially considering that the scaling of data streams DSA, DSB will likely differ from one another, there will likely be no relationship in time between the SAV and EAV words of data streams DSA, DSB, nor is any such relationship necessary or useful.

In this example, clock generator 25 of video decoder 20 generates edges of clock signals CLKA, CLKB that align with data streams DSA, DSB, respectively. In this example, rising edges of clock signals CLKA, CLKB are the active edges; of course, falling edges of clock signals CLKA, CLKB may alternatively be used (or, indeed, a rising edge of one clock signal and a falling edge of another clock signal may be the clocking edges). The alignment of clock signal CLKA with data stream DSA, and of clock signal CLKB with data stream DSB, should satisfy the corresponding data setup and hold times specified by encoder circuitry 30 and achievable by video decoder 20. In this example of FIG. 4, where two interleaved data streams DSA, DSB of the same frequency are generated at common output data port 27, clock signals CLKA, CLKB are at the same frequency as one another, but substantially 180 degrees out of phase. Of course, the phasing of clock signals CLKA, CLKB can vary from the complementary relationship of this example, so long as the setup and hold time specifications are met.

It is contemplated that the frequency of data streams DSA, DSB may differ from one another in some applications. In this instance, interleaved data streams DSA, DSB and corresponding clock signals CLKA, CLKB should be aligned to permit the higher frequency clock to transfer data at its desired rate, with the lower frequency data stream and clock filling in as available.

In the arrangement of FIG. 3, encoder circuitry 30 includes two separate encoder functions 30A, 30B. In this example, encoder function 30A processes the received digital video data for recording on disk drive 32, and as such formatter 23A in video decoder 20 may be applying a scaling of 1:1 (i.e., data stream DSA is communicating unscaled video). Encoder function 30B, in this example, processes received digital video data for display on split-screen display 34A, and as such formatter 23B is applying a scaling so that the displayed image is at a reduced resolution from that of the captured video (i.e., data stream DSB is communicating scaled video). Each of encoder functions 30A, 30B receives data bus DBUS, on which are presented all interleaved data streams DSA, DSB, but receives one of clock signals CLKA, CLKB, respectively. Accordingly, from the viewpoint of encoder 30A, one standard video data stream DSA is received from data bus DBUS, synchronized with clock signal CLKA; similarly, encoder 30B receives one standard video data stream DSB synchronous with clock signal CLKB. As such, each of encoders 30A, 30B can be realized by a conventional component, having only a single video input coupled to data bus DBUS and a corresponding single clock input, and operating according to a conventional standard (such as the ITU-R BT.656 standard). As such, "legacy" devices can be implemented into the system according to the preferred embodiment of the invention.

It is contemplated that those skilled in the art having reference to this specification will be readily able to realize circuitry according to this invention, using conventional circuits to perform the functions described in this specification. In so doing, care should be taken to ensure that setup and hold time specifications can be met by the interleaved data streams. In this regard, it may be useful to especially carefully place the circuits and devices on the respective integrated circuits to maximize setup and hold time margins, and to minimize bit-to-bit skew on the common data bus. Control of the load presented by the destination of the data streams will assist in establishing reasonable margin for these timing relationships.

According to the preferred embodiment of the invention, therefore, important advantages in the communication of data streams can be attained. Multiple synchronous data streams can be issued from a common data port to multiple destinations, or to multiple ports of a single destination device. As a result, the number of data output terminals required for the provision of multiple data streams need not increase from that required for a single data stream; only one or more additional clock outputs need be added. Importantly, the multiple data streams can be applied to data destinations constructed according to existing "legacy" data communication standards. As such, this invention can be deployed in widespread fashion without requiring the upgrading of destination equipment and components. This invention is especially beneficial in the communication of video signals, such as digital video data at multiple scalings, in which the data streams are coherent with one another.

Various alternative realizations and implementations of this invention are contemplated, and will be apparent to those skilled in the art having reference to this specification. For example, three or more data streams may be interleaved on the data bus, with a corresponding number of clock signals. In addition, in some alternative it may be appropriate for the data destination to generate the clock signals, rather than the source of the interleaved data streams. In this instance, as well as in the arrangement in which the data source generates the clock signals, other alternative applications of this invention can be envisioned, including memory access, direct memory access, and other similar data communications tasks.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A video system, comprising:
  at least one video signal source;
  a video decoder, coupled to receive a video signal from the at least one video signal source, the video decoder comprising:
    functional circuitry;
    a common data port, coupled to the functional circuitry, for outputting a plurality of data streams from the common data port in an interleaved fashion; and
    a clock generator for outputting a plurality of clock signals, each clock signal corresponding to one of the plurality of data streams output from the common data port;
  a data bus, coupled to the common data port;
  encoder circuitry, having a plurality of inputs coupled to the data bus, and having a plurality of clock inputs, each coupled to receive one of the plurality of clock signals;
  wherein the encoder circuitry comprises:
    a first encoder, having an input coupled to the data bus and having a clock input coupled to receive a first one of the plurality of clock signals, the first encoder for receiving a first one of the plurality of data streams synchronously with the first one of the plurality of clock signals; and
    a second encoder, having an input coupled to the data bus and having a clock input coupled to receive a second one of the plurality of clock signals, the second encoder for receiving a second one of the plurality of data streams synchronously with the second one of the plurality of clock signals.

2. The video system of claim 1, further comprising:

a recording unit, coupled to the encoder circuitry, for recording video data corresponding to a first one of the plurality of data streams; and a display unit, coupled to the encoder circuitry, for displaying a scaled image corresponding to a second one of the plurality of data streams.

3. The video system of claim 1, wherein the functional circuitry comprises:

interface circuitry for receiving at least one video input signal;

a first formatter, for formatting data corresponding to the video input signal according to a first image scaling, to generate a first one of the plurality of data streams; and a second formatter, for formatting data corresponding to the video input signal according to a second image scaling, to generate a second one of the plurality of data streams.

4. The video system of claim 3, wherein the first image scaling is a 1:1 scaling.

5. A method of communicating digital data, comprising:

a common data port for outputting a plurality of data streams from the common data port in an interleaved fashion;

applying a word of a first data stream to conductors of a data bus;

generating an edge of a first clock signal, at a first clock terminal of an integrated circuit, synchronously with the applying of the word of the first data stream;

then applying a word of a second data stream to the conductors of the data bus;

generating an edge of a second clock signal, at a second clock terminal of the integrated circuit, synchronously with the applying of the word of the second data stream;

repeating the applying and generating steps;

after the step of applying a word of a second data stream, then applying a word of a third data stream to the conductors of the data bus;

generating an edge of a third clock signal, at a third clock terminal of the integrated circuit, synchronously with the applying of the word of the third data stream;

wherein the repeating step also repeats the steps of applying a word of a third data stream and generating an edge of a third clock signal.

6. The method of claim 5, wherein the first and second data streams correspond to video data.

7. The method of claim 6, further comprising:

receiving a video input signal;

formatting digital data corresponding to the video input signal according to a first image scaling; and formatting digital data corresponding to the video input signal according to a second image scaling;

wherein the first data stream corresponds to the first image scaling, and the second data stream corresponds to the second image scaling.

8. The method of claim 7, wherein the first image scaling is 1:1.

9. The method of claim 5, wherein the first and second clock signals are at substantially the same frequency as one another.

10. The method of claim 5, wherein the first and second clock signals are at different frequencies from one another.

* * * * *